United States Patent [19]
Podwalny et al.

[11] Patent Number: 6,141,215
[45] Date of Patent: Oct. 31, 2000

[54] HYBRID COOLING HEAT EXCHANGER FIN GEOMETRY AND ORIENTATION

[75] Inventors: Gary Podwalny; Mark Penniman; Bryan Howell, all of Austin, Tex.

[73] Assignee: Dell USA, L.P., Round Rock, Tex.

[21] Appl. No.: 09/228,939

[22] Filed: Jan. 12, 1999

[51] Int. Cl.[7] ............................................. G06F 1/16
[52] U.S. Cl. ..................... 361/687; 361/698; 361/697; 361/701; 361/702; 361/703
[58] Field of Search ..................... 361/688, 690, 361/695, 697, 701–703, 704

[56] References Cited

U.S. PATENT DOCUMENTS

| | | |
|---|---|---|
| 5,331,507 | 7/1994 | Kyung et al. . |
| 5,424,913 | 6/1995 | Swindler . |
| 5,546,272 | 8/1996 | Moss et al. . |
| 5,568,360 | 10/1996 | Penniman et al. . |
| 5,572,403 | 11/1996 | Mills . |
| 5,930,115 | 7/1999 | Tracy et al. ............................ 361/704 |

*Primary Examiner*—Leo P. Picard
*Assistant Examiner*—Yean-Hsi Chang
*Attorney, Agent, or Firm*—Haynes and Boone LLP

[57] ABSTRACT

A cooling system for a computer includes a chassis having a sidewall with an opening formed therein. A heat spreader plate is mounted in the chassis including a heat sink attached thereto adjacent the sidewall. The heat sink has a side mounted base and a plurality of fins extending laterally from the base toward the sidewall. One of the fins is attached to the heat spreader plate. A heat pipe is connected to the heat spreader plate and extends into engagement with the heat sink. Each of the fins has a terminal edge and opposed ends. The fins at one of the opposed ends are uniformly sloped at an angle toward the base and are exposed to the opening in the sidewall, thus providing the appearance of an inlet grill.

9 Claims, 3 Drawing Sheets

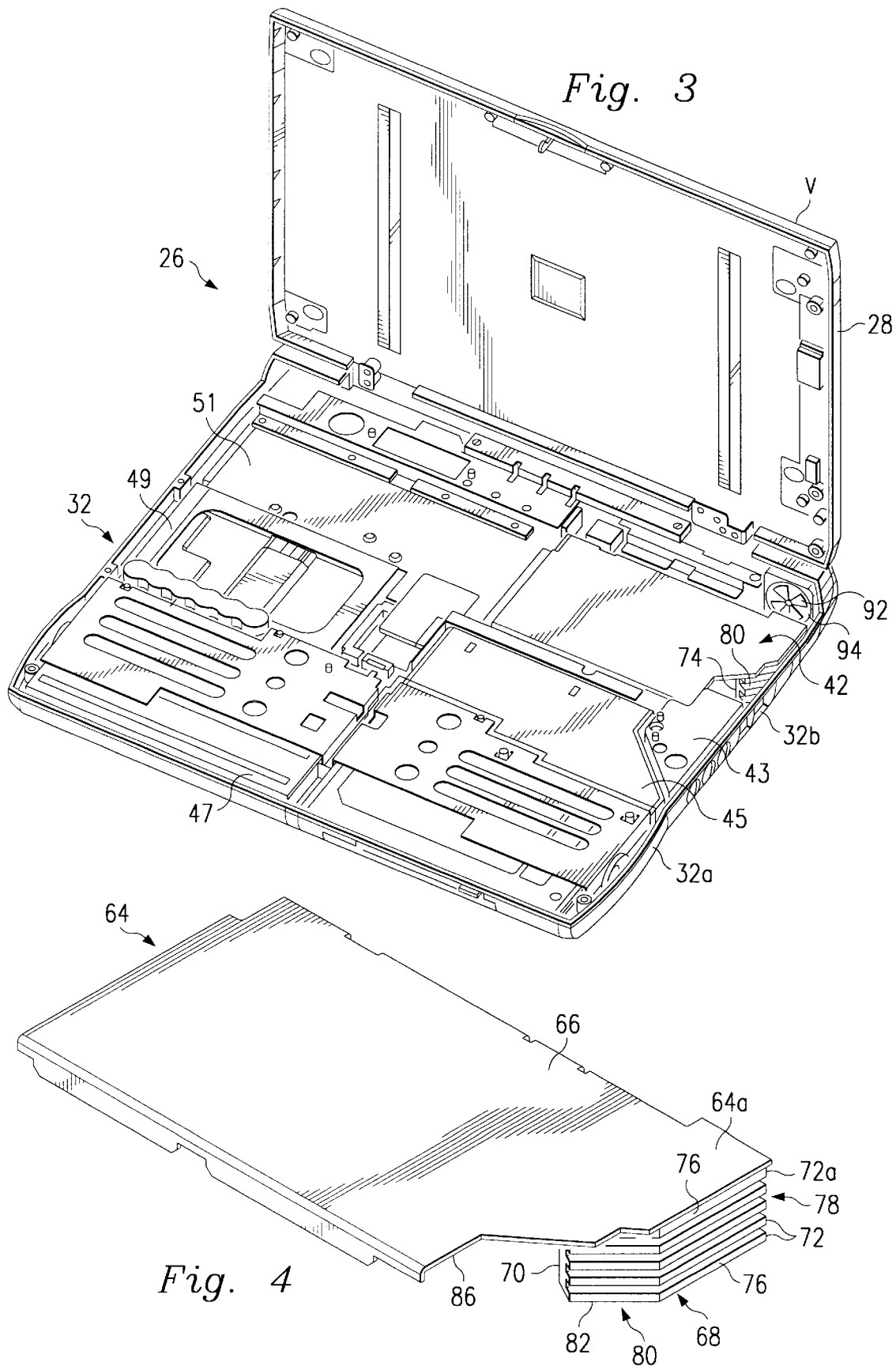

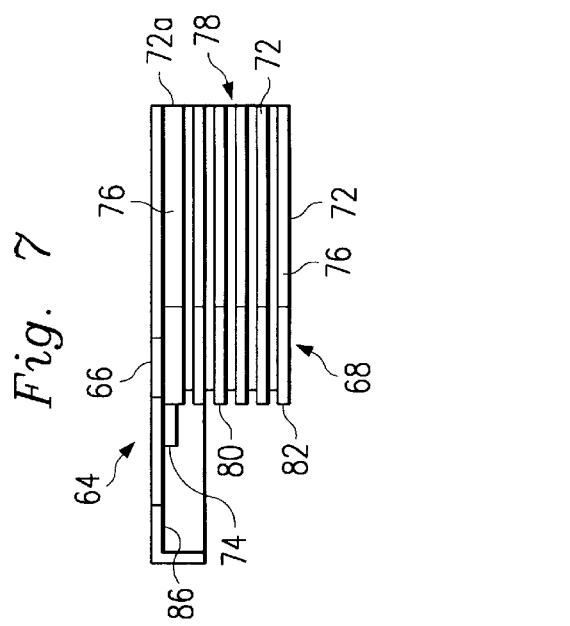
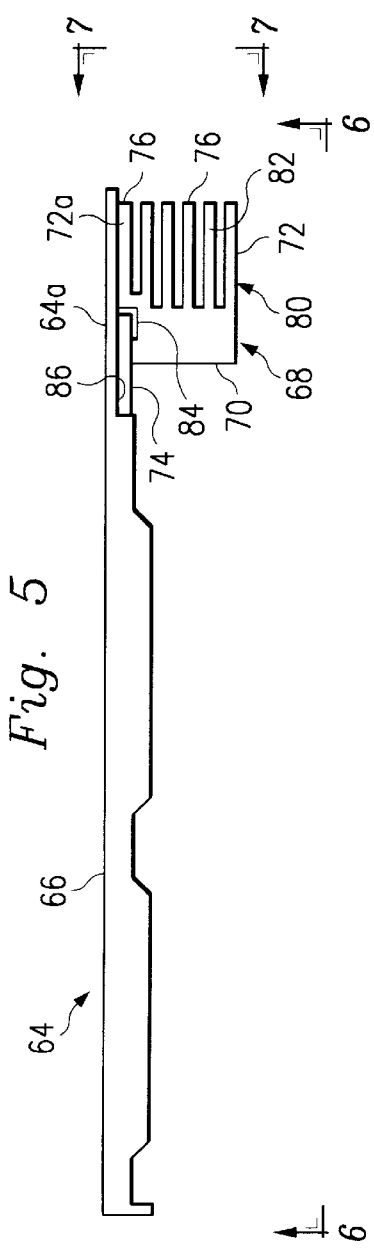
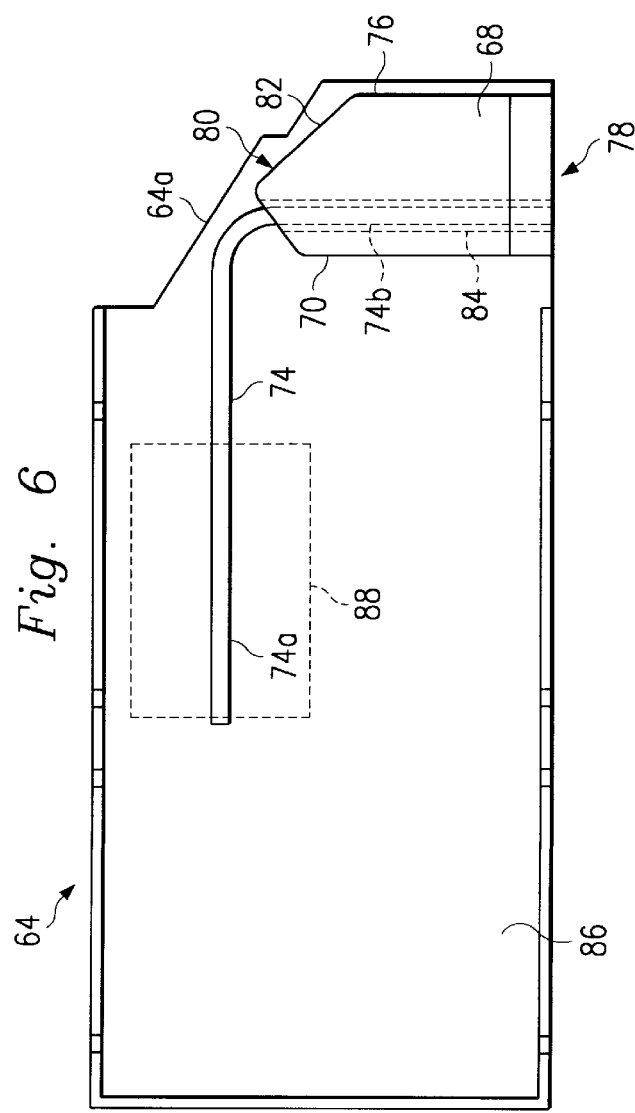

HYBRID COOLING HEAT EXCHANGER FIN GEOMETRY AND ORIENTATION

BACKGROUND

The disclosures herein relate generally to portable computers and more particularly to optimizing a hybrid cooling system within such computers.

Heat distribution has been a problem with some computers, especially with portable computers. In the past, heat spreaders, heat sinks, heat pipes, and fans have been used in hybrid cooling systems to address this problem. One type of heat spreader is a metal piece that is thermally coupled to a processor and distributes heat away from the processor. Typically, a heat sink is made of relatively pure aluminum for good thermal conductivity and for reduced weight. However, aluminum oxide coatings typically form on the outside of items made of aluminum which reduces the ability of the object to provide low impedance electrical connections with other items in contact with the aluminum material. Because heat spreaders typically serve only one function, extra pieces are added to the computer system assembly as well as increasing the complexity of the build and repair operations.

Fans and heat sinks provide a cost effective mechanism for thermally managing many types of portable computer systems. Fans, however, require power and heat sinks require space. While power and space are generally in abundant supply in desktop-type minicomputers, portable computers have only a limited supply of both power and space. A commercial advantage is achieved by manufacturing portable computers that are both small and lightweight. Further, portable computers must operate with power conservation in mind. An operable fan may unduly draw upon the batteries of a laptop making it unattractive for long periods of battery-operated use.

Heat pipes are self contained, phase transformation, heat carrying devices, i.e. a superconductor of heat. A typical heat pipe may comprise a closed copper tube having a partial vacuum internally. Water in a hot portion of the tube boils at a lower than usual temperature in the partial vacuum. The boiling water seeks a cooler spot and thus steam moves to carry heat to a cooler portion where the steam condenses to cooler water which returns to the hot portion. The cycle is ongoing which provides a contained circulation system.

There is a constant effort to optimize heat exchanger configurations in portable computers so as to minimize airflow restrictions, control airflow through ducting to a cooling fan, maximize thermal transfer efficiently, minimize airflow noise, facilitate assembly and be aesthetically acceptable.

Typically, heat exchanger configurations in portable computers are enclosed in the chassis and include air inlet grills and exhaust vents, and in some cases are not fully optimized for both heat transfer ability and aesthetic features.

Therefore, what is needed is a hybrid cooling device utilizing both an active and passive cooling apparatus and method which is optimized within present space limitations to provide increased heat exchange capabilities and improve aesthetic integrity.

SUMMARY

One embodiment, accordingly, provides an apparatus and method for optimizing the heat exchanger configuration without additional space requirements, and in a manner which is aesthetically enhanced. To this end, a heat sink includes a base and a plurality of fins extending laterally from the base. Each of the fins has a terminal edge and opposed ends. The fins at one of the opposed ends are disposed at an angle toward the base.

A principal advantage of this embodiment is that by using horizontal and partially exposed heat exchanger fins in a design-for-assembly configuration, the thermal arrangement can achieve an optimized heat transfer capability with an aesthetically pleasing feature. The partially exposed horizontal heat exchanger fins allow less restricted airflow within the intra fin channels.

BRIEF DESCRIPTION OF THE DRAWING FIGURES

FIG. 3 is another perspective view illustrating an embodiment of a partially disassembled laptop computer.

FIG. 4 is an exploded isometric view illustrating an embodiment of a hybrid cooling system.

FIG. 5 is a side view illustrating an embodiment of a heat spreader plate having a heat sink and a heat pipe connected thereto.

FIG. 6 is an underside view of the heat spreader plate viewed along the line 6—6 of FIG. 5.

FIG. 7 is an end view of the heat spreader plate viewed along the line 7—7 of FIG. 5.

DETAILED DESCRIPTION

Figure 1:
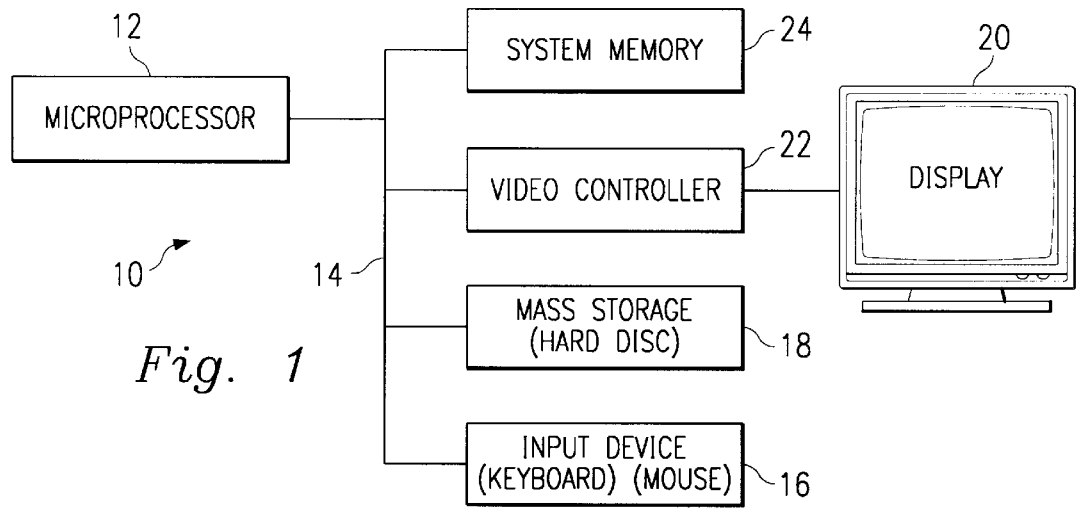
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
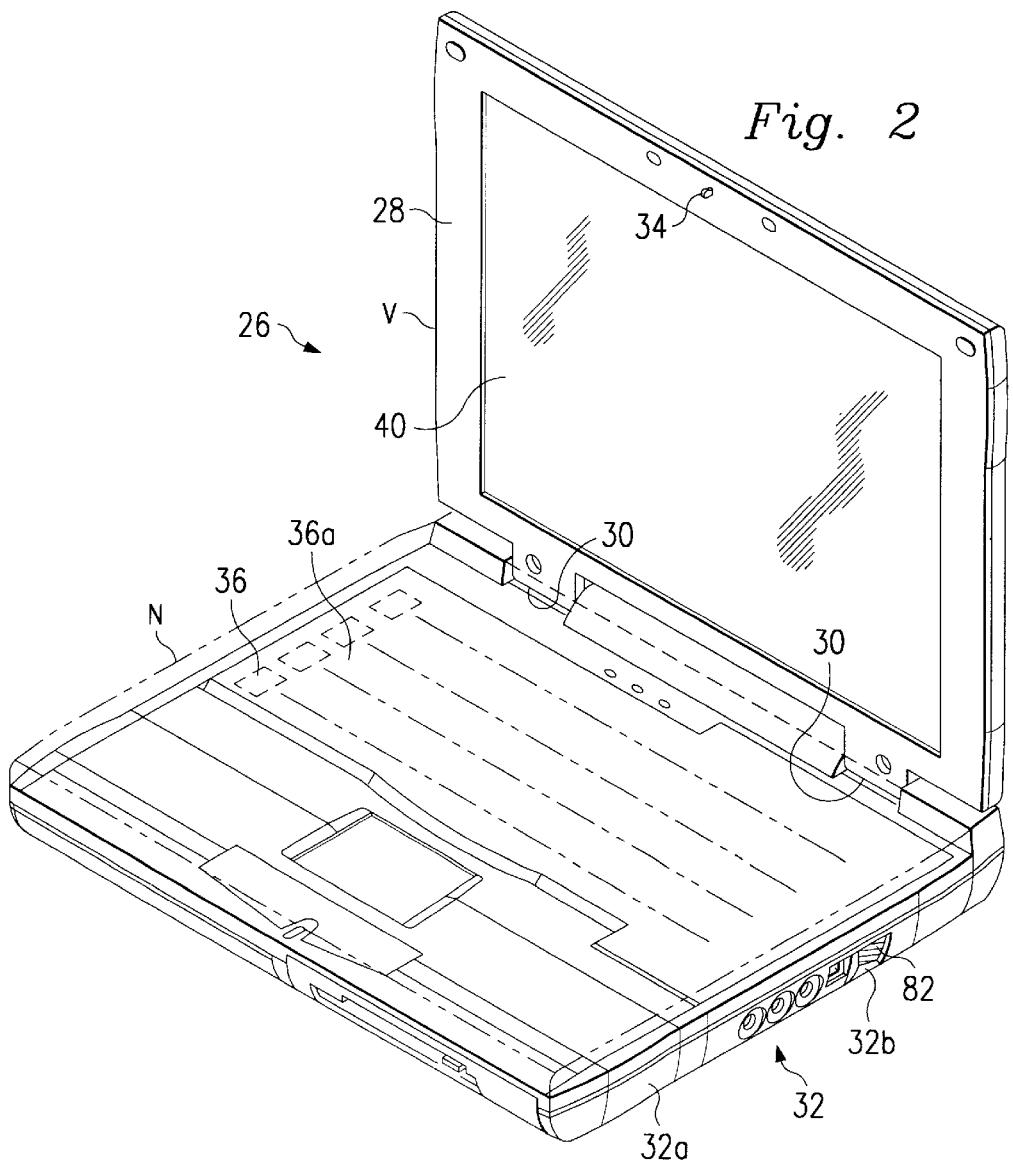
FIG. 2 is a perspective view illustrating an embodiment of a portable laptop computer.

Referring to FIG. 2, illustrated is a portable, notebook size computer designated 26 comprising a self-contained system, such as that illustrated at 10 in FIG. 1, and including a hinged top or lid 28 rotatable about a hinge or hinges 30 from a nested position "N", with a horizontal base 32, to a substantially vertical or open position "V". Opening of the notebook style portable computer by manipulation of a latch 34, reveals a plurality of key 36 on a keyboard 36a mounted base 32, and a monitor screen 40 mounted in lid or top 28. Base 32 includes a sidewall 32a having an opening 32b formed therein.

Computer 26, FIG. 3 illustrates the base 32 with the keyboard 36a removed thus exposing some of the components mounted in base 32. Some of the components include a hybrid cooling section 42, an audio subsection 43, a CD floppy module section 45, a battery bay section 47, a hard-disk drive section 49 and a motherboard 51. Top 28 is illustrated in the open position V and has the monitor screen 40 removed. Hybrid cooling section 42, FIGS. 4–7, includes a heat transfer apparatus including a heat spreader plate 64 having a heat spreader surface 66. Heat spreader plate 64 is connected to a heat sink 68 which includes a base 70 and a plurality of fins 72 extending laterally from base 70. One of the fins 72*a* has a planar surface attached to a planar surface of an extended portion 64*a* of heat spreader plate 64. A heat pipe 74 is connected to heat spreader plate 64 and extends into connection with heat sink 68. Each of the fins 72 and 72*a* have a terminal edge 76 and a pair of opposed ends 78 and 80, FIGS. 4 and 6. Opposed end 80 includes a slanted edge 82 on each of the fins 72 and 72*a* such that the edge 82 is angled toward the base 70.

A groove 84 FIG. 5, is formed in base 70 adjacent fin 72*a* and extended portion 64*a* for receiving heat pipe 74. The heat pipe 74 is attached to an underside 86 of heat spreader surface 66 which supports heat pipe 74 secured thereto by a suitable thermal adhesive. A first portion 74*a* of heat pipe 74, FIG. 6 extends along the underside 86 of heat spreader surface 66 to a second portion 74*b* of heat pipe 74 which is disposed substantially at a right angle with first portion 74*a*. Second portion 74*b* extends to engage groove 84 at one opposed end 80 and terminates adjacent the other opposed end 78. A thermal film 88, illustrated in phantom outline in FIG. 6, may be used to cover first portion 74*a* of heat pipe 74 so as to provide compliant thermal contact with a processor module (not shown) which seats adjacent the underside 86 of heat spreader surface 66.

In operation, when heat spreader plate 64 is mounted in base 32 of portable computer 26, opposed end 80 of heat sink 68 is positioned adjacent opening 32*b* in sidewall 32*a*. Heat generated from the above-mentioned processor module, is passively transferred to heat spreader plate 64. Some of the heat is spread to heat spreader surface 66 and some of the heat is moved to heat sink 68 by heat pipe 74. A fan 92, FIG. 3 mounted in a fan duct 94 in base 32, draws cooling air across heat sink 68 to actively carry heat away from heat sink 68. The slanted edge 82, FIG. 2, of heat sink 68 is exposed in opening 32*b* of base 32 and provides optimized heat transfer capability which includes an aesthetically pleasing feature. No inlet grill is required in opening 32*b*, and the partially exposed laterally extending fins 72 allow less restricted airflow within the intra-fin channels.

As a result, one embodiment provides a heat transfer apparatus including a heat spreader plate and a heat sink connected to the heat spreader plate. The heat sink has a base and a plurality of fins extending laterally from the base. One of the fins is attached to the heat spreader plate. A heat pipe is connected to the heat spreader plate and extends into connection with the heat sink.

Another embodiment provides a heat sink including a base and a plurality of fins extending laterally from the base. Each of the fins has a terminal edge and opposed ends. The fins at one of the opposed ends are disposed at an angle toward the base.

Another embodiment provides a computer system including a chassis, an input coupled to provide input to the microprocessor, a mass storage coupled to the microprocessor, a display coupled to the microprocessor by a video controller, and a memory coupled to provide storage to facilitate execution of computer programs by the microprocessor. A heat spreader plate is mounted in the chassis. A heat sink is connected to the heat spreader plate. The heat sink has a base and a plurality of fins extending laterally from the base. One of the fins is attached to the heat spreader plate. A heat pipe is connected to the heat spreader plate and extends into connection with the heat sink.

Another embodiment provides a cooling system for a computer including a chassis having a sidewall with an opening formed therein. A heat sink is mounted in the chassis adjacent the sidewall. The heat sink includes a base and a plurality of fins extending laterally from the base toward the sidewall. Each of the fins has a terminal edge and opposed ends. The fins at one of the opposed ends are slanted at an angle toward the base and exposed to the opening in the sidewall.

A further embodiment provides a method for cooling a computer chassis by forming an opening in a sidewall of a computer chassis, mounting a heat sink in the chassis adjacent the sidewall so that a plurality of fins of the heat sink extend laterally from a base thereof toward the sidewall, forming each of the fins to include a terminal edge and opposed ends, and forming the fins at one of the opposed ends to be slanted at an angle toward the base and exposed to the opening in the sidewall.

As it can be seen, the principal advantages of these embodiments are that by using horizontal and partially exposed heat exchanger fins in a designed for assembly configuration, the thermal arrangement can achieve an optimized heat transfer capability with an aesthetically pleasing feature. The partially exposed horizontal heat exchanger fins allow less restricted airflow within the intra-fin channels. This device does not require an inlet grill which results in an air flow restriction. It instead uses the horizontal or lateral fins to provide the exterior appearance. The partially exposed fins are coolest nearest the outside surface of the system at the extremities of the fins, where the user is most likely to touch the heat exchanger surface. The top horizontal fin also serves to seal off the flow duct channel within the notebook when installed top down. The angled air inlet combines a clean unobstructed, directed airpath that is, at the same time, thermally efficient and visually attractive.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A heat transfer apparatus comprising:

a heat spreader plate;

a heat sink connected to the heat spreader plate, the heat sink having a base and a plurality of fins extending laterally from the base, a first one of the fins being attached to the heat spreader plate;

a heat pipe connected to the heat spreader plate and extending into engagement with the heat sink;

the heat spreader plate including an extended portion, the heat sink being attached to the extended portion;

the extended portion including a planar surface engaged with a planar surface of said first one of the fins; and the base having a common planar surface with said first one of the fins, the planar surface including a groove formed therein for receiving the heat pipe.

2. The apparatus as defined in claim 1 wherein the extended portion is adjacent the groove.

3. The apparatus as defined in claim 1 wherein the groove is adjacent said first one of the fins.

4. A heat sink comprising:

a base;

a plurality of fins extending laterally from the base, each of the fins having a terminal edge and opposed ends, the base having a common planar surface with a first one of the fins, and the planar surface having a groove formed therein for receiving a heat pipe; and the fins at one of the opposed ends being disposed at an angle toward the base.

5. A computer system comprising:

a chassis;

a microprocessor mounted in the chassis;

an input coupled to provide input to the microprocessor;

a mass storage coupled to the microprocessor;

a display coupled to the microprocessor by a video controller;

a memory coupled to provide storage to facilitate execution of computer programs by the microprocessor;

a heat spreader plate mounted in the chassis;

a heat sink connected to the heat spreader plate, the heat sink having a base and a plurality of fins extending laterally from the base, a first one of the fins being attached to the heat spreader plate;

a heat pipe connected to the heat spreader plate and extending into engagement with the heat sink;

the heat spreader plate including an extended portion, the heat sink being attached to the extended portion;

the extended portion including a planar surface engaged with a planar surface of said first one of the fins; and the base having a common planar surface with said first one of the fins, the planar surface including a groove formed therein for receiving the heat pipe.

6. The apparatus as defined in claim 5 wherein the extended portion is adjacent the groove.

7. The apparatus as defined in claim 5 wherein the groove is adjacent said first one of the fins.

8. A cooling system for a computer comprising:

a chassis including a sidewall having an opening formed therein;

a heat spreader plate mounted in the chassis;

a heat sink mounted on the heat spreader plate adjacent the sidewall, the heat sink including a base and a plurality of fins extending laterally from the base toward the sidewall, each of the fins having a terminal edge and opposed ends, the base having a common planar surface with one of the fins, and the planar surface having a groove formed therein for receiving a heat pipe; and the fins at one of the opposed ends being slanted at an angle toward the base and exposed to the opening in the sidewall.

9. A method for cooling a computer chassis comprising the steps of:

forming an opening in a sidewall of the computer chassis;

mounting a heat spreader plate in the chassis;

mounting a heat sink on the heat spreader plate adjacent the sidewall so that a plurality of fins of the heat sink extend laterally from a base thereof toward the sidewall;

forming a common planar surface with a first one of fins and the base;

forming a groove in the planar surface for receiving a heat pipe;

forming each of the fins to include a terminal edge and opposed ends; and forming the fins at one of the opposed ends to be slanted at an angle toward the base and exposed to the opening in the sidewall.

* * * * *